United States Patent [19]

Taniguchi et al.

[11] Patent Number: 4,869,864
[45] Date of Patent: Sep. 26, 1989

[54] METHOD OF MANUFACTURING POLYBUTYLENE TEREPHTHALATE RESIN FILMS

[75] Inventors: Kotaro Taniguchi, Nagaokakyo; Takehiko Shimada, Nara; Shigekazu Tanimoto; Shigeru Nedzu, both of Fuji, all of Japan

[73] Assignee: Polyplastics Co., Ltd., Osaka, Japan

[21] Appl. No.: 179,010

[22] Filed: Apr. 8, 1988

[30] Foreign Application Priority Data

Apr. 8, 1987 [JP] Japan ................................ 62-86100

[51] Int. Cl.$^4$ ............................................ B29C 47/20
[52] U.S. Cl. ................................ 264/564; 264/331.21; 425/326.1
[58] Field of Search ................... 264/564–569, 264/235, 235.8, 331.21; 425/326.1, 72.1

[56] References Cited

U.S. PATENT DOCUMENTS

| 3,725,519 | 4/1973 | Seifried et al. ...................... 264/567 |
| 3,875,119 | 4/1975 | Aoki et al. ........................ 264/235.8 |
| 3,961,008 | 6/1976 | Kuratsuji et al. .................... 264/567 |
| 4,145,466 | 3/1979 | Leslie et al. ........................ 264/564 |
| 4,216,253 | 8/1980 | Bonnebat et al. .................... 425/144 |
| 4,462,953 | 7/1984 | Feil et al. ............................ 264/569 |

FOREIGN PATENT DOCUMENTS

| 2460394 | 6/1976 | Fed. Rep. of Germany ...... 264/564 |
| 57-66933 | 4/1982 | Japan ................................. 264/564 |

Primary Examiner—Jeffery Thurlow
Attorney, Agent, or Firm—Nixon & Vanderhye

[57] ABSTRACT

A polybutylene terephthalate resin film is produced by forming a film of a polybutylene terephthalate resin having an inherent viscosity of more than 1.0 by the inflation molding technique and under the condition of extrusion resin temperatures within a range defined by the following relation:

melting point (°C.) < extrusion resin temperature (°C.) < melting point −26+53×inherent viscosity (°C.).

1 Claim, 1 Drawing Sheet

INHERENT VISCOSITY

PRACTICABLE RANGE: TEMP. RANGE WHICH SATISFIES THE RELATION:

$MP < T < MP - 26 + 53 \cdot IV, \ 1.0 < IV$

PREFERRED RANGE: TEMP. RANGE WHICH SATISFIES THE RELATION:

$MP + 10 \leq T \leq MP - 36 + 53 \cdot IV, \ 1.2 \leq IV \leq 2.5$ where MP: MELTING POINT;
T: EXTRUSION RESIN TEMP.;
IV: INHERENT VISCOSITY

METHOD OF MANUFACTURING POLYBUTYLENE TEREPHTHALATE RESIN FILMS

FIELD OF INVENTION

This invention relates to a novel film-forming method for polybutylene terephthalate resins.

BACKGROUND AND SUMMARY OF THE INVENTION

Polybutylene terephthalate resins are widely used as typical engineering plastics.

Most of these resins, however, are exclusively used for injection moldings, and are rarely used for extrusion moldings, and particularly for extrusion-molding of films. The reason for this is that molding such resin into films is extremely difficult.

Generally, there are two types of methods for production of films, namely, the T-die method and the inflation method. The T-die method is usually such that a stream of molten plastics introduced through one inlet is broadened to a desired film width and made as uniform in thickness as possible, so that the melt in extruded in a thin film pattern through a slit-shaped nozzle, the extruded resin being then cooled into a film. The inflation method is often employed in molding polyethylenes into films, which method generally include extruding the plastic in the form of a tube through an extrusion nozzle, the tube being inflated by blowing a fluid (e.g., air) thereinto, whereby the extruded resin is formed into a tubular film. The T-die and inflation methods have their respective advantages and disadvantages. Generally, the inflation method, as compared with the T-die method, provides higher productivity and greater economy and is suitable for production of thin films, but its applicability varies according to the kind of resin material used. As such, it cannot be said that the method is applicable for use with any kind of resin, and naturally the range of resin varieties with which the method can be employed is limited to a few special kinds of resins, such as polyolefins. Generally, polyesters, such as polyethylene terephthalate and polybutylene terephthalate, are film-moldable by the T-die method, but on the other hand, manufacturing of films of these resins involve various technical problems to be solved and, as such, it has not been industrialized to date.

The present invention is directed to a method which enables films of polybutylene terephthalate to be produced by the inflation technique, and as a result, they found that polybutylene terephthalate could be adapted for film extrusion by the inflation technique by selecting a specific variety of polybutylene terephthalate and a specific range of temperature conditions.

DETAILED DESCRIPTION OF THE INVENTION

Figure 1:
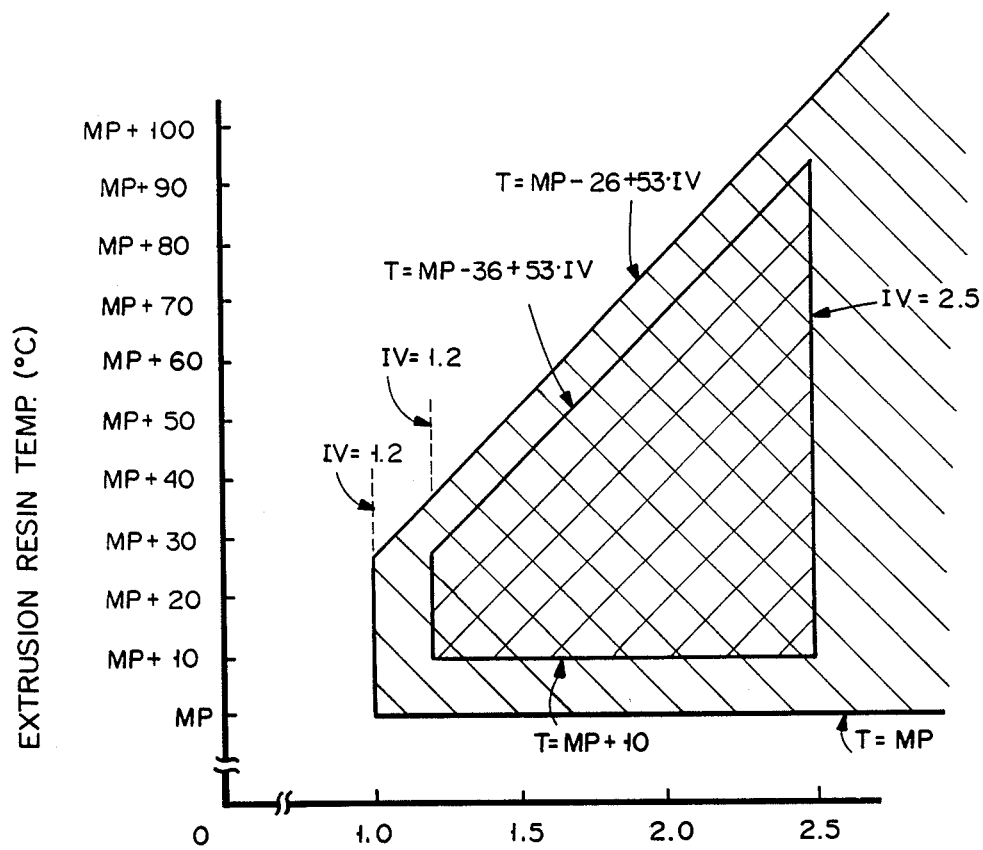
FIG. 1 is a graph showing the extrusion resin temperature ranges applicable to form inflation-molded films of polybutylene terephthalate resins according to the present invention.
Figure 1:
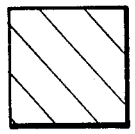
Figure 1:
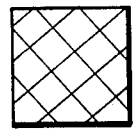

The present invention provides a method of manufacturing a polybutylene terephthalate resin film comprising forming a film of a polybutylene terephthalate resin having an inherent viscosity of more than 1.0 by the inflation molding technique and under the condition of extrusion resin temperatures within a range defined by the following relation:
melting point (°C.) < extrusion resin temperature (°C.) < melting point $-26 + 53 \times$ inherent viscosity - (°C.)

The term "inherent viscosity" used herein refers to a value therefor as measured in orthochlorophenol at 25° C.

The present inventors have found that, whereas stable film making of polyethylene terephthalate resins by inflation molding is extremely difficult under any conditions, it is possible to filmize a polybutylene terephthalate, only if its inherent viscosity (hereinafter referred to as IV) is more than 1.0, by inflation-molding same in such a way that the extrusion resin temperature comes within the range covered by the foregoing relation.

Such polybutylene terephthalate resin of more than 1.0 in IV is higher in IV and greater in average molecular weight than ordinary-types of polybutylene terephthalates, and those having an IV of 1.2–2.5, inter alia, are preferred, which may be in the form of either a homopolymer or a copolymer consisting principally of a polybutylene terephthalate. One having an IV of more than 2.5 can hardly be produced as such. One having an IV of less than 1.0 is undesirable because it is difficult to filmize because of drawdown possibilities during inflation molding. However, a mixture of a polybutylene terephthalate having an IV of less than 1.0 and one having an IV of more than 1.0 may be formed into a film if the resulting IV of the mixture is more than 1.0.

For the purpose of inflation molding, it is essential that in melt extruding through an annular nozzle a polybutylene terephthalate resin having such a specific IV value as above defined by the inflation technique, the temperature of the resin should be within a range defined by the following relation:
melting point (°C.) < extrusion resin temperature (°C.) < melting point $-26 + 53 \times$ inherent viscosity (°C.)

The polybutylene terephthalate resin used is preferably of an IV of 1.2–2.5, and especially preferably of an IV of 1.5–2.2, and the temperature of the resin is preferably within a range defined by the following relation:
melting point + 10 (°C.) ≦ extrusion resin temperature (°C.) ≦ melting point $-36 + 53 \times$ inherent viscosity (°C.)

These ranges of resin temperatures for inflation molding are shown in Table 1. If the resin temperature is too high, the viscosity of the melt becomes so low that filmization of the resin is impracticable because of drawdown possiblities. If the temperature is too low, the viscosity of the melt becomes so high that greater pressure loss in the die is involved, the power requirements becoming greater for operation of the extruding machine, which is followed by decreased productivity.

Another undesirable effect of such low temperature is increased film thickness irregularity due to non-uniformity of resin flow in the die.

According to the invention, film making of a polybutylene terephthalate resin by the inflation technique is possible by maintaining the foregoing essential requirements, and for the other conditions, general conditions of the inflation technique are applicable. By employing a crosshead die, a tubular melt of polybutylene terephthalate resin is extruded upward or downward; the tube is held at one end between the pinch rolls and air is fed thereinto, so that the tube is continuously taken up while being inflated to a predetermined size. Meanwhile, the die is rotated forward or reversed, whereby any possible thickness irregularity can be prevented. The tubular film may be cut at both of its ends and sealed at one end so that it can be used as a bag. Or, it may be suitably drawn into one continuous film and heat set and/or otherwise treated; thus, as a film having advantageous properties of polybutylene terephthalate resins and having some suitable variations given according to the purpose for which it is used, the product can be offered for various end uses. In the manufacture of films according to the invention, it is possible to adjust film gauge in practically same manner as in the conventional inflation process. Generally, film gauge is adjustable within the range of 0.005–0.1 mm.

In combination with the polybutylene terephthalate resin used in the practice of the invention, various known materials which are usually added to ordinary thermoplastic or thermosetting resins may be suitably used depending upon the performance characteristics required of the product. Materials useful for such purposes include plasticizers, stabilizers, such as antioxidant and U.V. light absorber, antistatic agents, surface active agents, colorants, such as dyes and pigments, and lubricants and crystallization accelerators (nucleating agents) useful for fluidity improvement. Also, other thermoplastic resins and/or inorganic fillers may be supplementarily used for addition in small amounts insofaras it is not detrimental to the purpose of the invention.

(Advantages of the Invention)

As above described, according to the invention, it is possible to manufacture polybutylene terephthalate resin films by the inflation technique. The invention assures improved productivity and economy as compared with the conventional T-die method, and makes it possible to easily produce even thinner gage films through application of known techniques. Films produced according to the invention have excellent properties inherent to polybutylene terephthalate resins, including, for example, good mechanical, physical, chemical and thermal properties. Further they have a special advantage that they are less subject to moisture and gas permeation. Therefore, they can be advantageously used either alone as such or in lamination with other film or metallic foil for packaging and various other purposes.

(EXAMPLES)

The invention will be further illustrated by the following examples. It is understood, however, that the invention is not limited by these examples.

EXAMPLE 1

A polybutylene terephthalate resin P (IV 2.0, melting point 228° C.) was used. From a 50 mm$\phi$ extruding machine, with a die diameter of 120 mm and a die lip clearance of 1 mm, a tubular film was extruded at a resin temperature of 285° C., and a blow ratio of 1.3, and the film was taken off at a take-up rate of 30 m/min while being cooled by air. Thus, a film of 18$\mu$ gauge was obtained.

The properties of the film produced were as shown in Table 1.

Property evaluation of the resin and of the film was carried out in the following manner: IV: measured in orthochlorophenol at 25° C.

Melting point: measured by DSC (heat-up rate 5° C./min) and at a heat absorption peak location.

Tensile strength and elongation: measured according to ASTM D 882

Oxygen and nitrogen permeabilities: measured according to ASTM D 1434.

TABLE 1

| | |
|---|---|
| Film gage ($\mu$) | 18 |
| Tensile strength (kg/cm$^2$) | 583 |
| Tensile elongation (%) | 497 |
| Oxygen permeability (cc/m$^2 \cdot$ day $\cdot$ 1 atm) | 293.6 |
| Nitrogen permeability (cc/m$^2 \cdot$ day $\cdot$ 1 atm) | 36.4 |

EXAMPLES 2–7; COMPARATIVE EXAMPLE 1–3

Polybutylene terephthalate resin P, and polybutylene terephthalate resin Q (IV 1.63, melting point 228° C.), and polybutylene terephthalate resin R (IV 0.76, melting point 228° C.) were used. In an apparatus similar to the one used in Example 1, films of various different gauges as shown in Table 2 were produced at varied extrusion resin temperatures. Properties of the films were evaluated. The results are shown in Table 2.

TABLE 2

| IV | Example 2 | Example 3 2.0 (Resin P) | Comp. Exp. 1 | Example 4 | Example 5 1.63 (Resin Q) | Example 6 | Comp. Exp. 2 | Comp. Exp. 3 0.76 (Resin R) |
|---|---|---|---|---|---|---|---|---|
| Extrusion resin temp. | 285 | 300 | 315 | 275 | 275 | 285 | 300 | 250 |
| Film gage ($\mu$) | 35 | 9 | — | 35 | 18 | 9 | — | — |
| Tensile strength (kg/cm$^2$) | 561 | 833 | — | 526 | 534 | 750 | — | — |
| Tensile elongation (%) | 565 | 470 | — | 486 | 415 | 392 | — | — |
| Oxygen permeability (cc/m$^2 \cdot$ day $\cdot$ 1 atm) | 151 | 587 | — | 160 | 286 | 596 | — | — |
| Nitrogen permeability | 18.7 | 72.7 | — | 19.0 | 37.8 | 73.6 | — | — |

TABLE 2-continued

| | IV | Example 2 | Example 3 2.0 (Resin P) | Comp. Exp. 1 | Example 4 | Example 5 1.63 (Resin Q) | Example 6 | Comp. Exp. 2 | Comp. Exp. 3 0.76 (Resin R) |
|---|---|---|---|---|---|---|---|---|---|
| (cc/m$^2$ · day · 1 atm) Moldability | | stable | slightly unstable | no good | stable | stable | slightly unstable | no good | no good |

What is claimed is:

1. In an inflation molding method for forming a tubular film of a thermoplastic resin by continuously extruding molten resin through a crosshead die in a predetermined extrusion direction so as to form a tubular film of the extruded resin, collapsing the tubular film between pinch rolls disposed a predetermined distance from said crosshead die, and concurrently blowing a fluid in the extrusion direction into the uncollapsed extruded tubular film so as to inflate the uncollapsed tubular film, the improvement comprising using a polybutylene terephthalate resin having an inherent viscosity IV of between 1.2 to 2.5, and extruding the polybutylene terephthalate resin at an extrusion temperature T(°C.) of said resin which is greater than or equal to the melting point temperature MP(°C.) of said resin plus 10° C., but less than or equal to the sum of MP minus 36 and IV times 53.

* * * * *

UNITED STATES PATENT AND TRADEMARK OFFICE
CERTIFICATE OF CORRECTION

PATENT NO. : 4,869,864

DATED : September 26, 1989

INVENTOR(S) : Taniguchi et al

It is certified that error appears in the above-identified patent and that said Letters Patent is hereby corrected as shown below:

Column 1, line 23, after "usually" insert --practiced--;
line 27, after "melt" delete "in" and insert --is--;
line 29, after "zle" delete the comma (,) and insert a period (.); change "the" to --The-- and after "resin" delete "being" and insert --is--;
line 31, change "ylenes" to --ylene-- and after "ylenes" insert --resins--, after "films," delete "which method" and insert --and-- and change "include" to --includes--;
line 51, change "of" to --from-- and change "involve" to --involves--
line 57, after "technique" delete ", and as a result, they" and insert a period (.);
line 58, delete "found" and insert --More specifically, the present invention is based upon the finding--.

Column 2, line 21, after "possible" delete "to filmize a" and insert --for--; after "is" and before "possible" insert --nonetheless--;
line 22, before "only" insert --to be formed into a film--;
line 23, after "molding" insert --the--;
line 24, after "temperature" delete "comes" and insert --is--;
line 33, delete "One" and insert --Polybutylene terephthalate resin--;
line 34, delete "One" and insert --On the other hand, polybutylene terephthalate resin--;
line 36, delete "because of" and insert --due to--;
line 44, delete "such a" and insert --the--;
line 62, delete "filmization" and insert --film formation--.

UNITED STATES PATENT AND TRADEMARK OFFICE
CERTIFICATE OF CORRECTION

PATENT NO. : 4,869,864

DATED : September 26, 1989

INVENTOR(S) : Taniguchi, et al

It is certified that error appears in the above-identified patent and that said Letters Patent is hereby corrected as shown below:

Column 3, line 21, delete "treated thus:" and insert --treated.  Thus,--:

line 22, before "advantageous" insert --the usual--.

Signed and Sealed this

First Day of January, 1991

*Attest:*

HARRY F. MANBECK, JR.

*Attesting Officer*      *Commissioner of Patents and Trademarks*